United States Patent
Gwen

(10) Patent No.: US 11,939,242 B1
(45) Date of Patent: Mar. 26, 2024

(54) HOUSING FOR WATER FILTER CARTRIDGES

(71) Applicant: CORE PACIFIC INC., Houston, TX (US)

(72) Inventor: Patrick Gwen, Houston, TX (US)

( * ) Notice: Subject to any disclaimer, the term of this patent is extended or adjusted under 35 U.S.C. 154(b) by 0 days.

(21) Appl. No.: 17/932,143

(22) Filed: Sep. 14, 2022

(51) Int. Cl.
    *C02F 1/44*     (2023.01)

(52) U.S. Cl.
    CPC .......... *C02F 1/44* (2013.01); *C02F 2201/006* (2013.01)

(58) Field of Classification Search
    CPC ........ B01D 29/50; B01D 29/54; B01D 29/56; B01D 2201/30; B01D 35/30; B01D 35/301; C02F 2201/003; C02F 2201/006; C02F 2307/10
    See application file for complete search history.

(56) References Cited

U.S. PATENT DOCUMENTS

| | | | |
|---|---|---|---|
| 5,328,609 A | 7/1994 | Magnusson | |
| 5,342,519 A | 8/1994 | Friedmann | |
| 5,407,571 A | 4/1995 | Rothwell | |
| 6,360,764 B1 | 3/2002 | Fritze | |
| 7,513,996 B2 * | 4/2009 | Kloos | C02F 1/441 210/260 |
| 2005/0045552 A1 | 3/2005 | Tadlock | |
| 2005/0098491 A1 * | 5/2005 | Carlotto | C02F 9/20 210/232 |
| 2006/0186026 A1 | 8/2006 | Saleh | |
| 2007/0000833 A1 | 1/2007 | Levy | |
| 2015/0344321 A1 | 12/2015 | Allsip | |
| 2016/0060135 A1 * | 3/2016 | Huang | B01D 61/08 210/652 |
| 2019/0135655 A1 * | 5/2019 | Steudten | B01D 35/26 |
| 2019/0282938 A1 | 9/2019 | Fiox | |
| 2023/0115880 A1 * | 4/2023 | Kang | B01D 35/305 210/238 |

FOREIGN PATENT DOCUMENTS

WO    WO 2021/256689    * 12/2021    ............. B01D 35/12

* cited by examiner

*Primary Examiner* — Benjamin M Kurtz
(74) *Attorney, Agent, or Firm* — Egbert, McDaniel & Swartz, PLLC

(57) ABSTRACT

A housing for filter cartridges has a first receptacle, a second receptacle and a third receptacle. The first receptacle is adapted to receive a first water filter cartridge therein. The second receptacle is adapted to receive a second water filter cartridge therein. The second receptacle is positioned to one side of the first receptacle such that a longitudinal axis of the second receptacle is in parallel relation to a longitudinal axis of the first receptacle. The third receptacle is adapted to receive a third water filter cartridge therein. The third receptacle is positioned above the first receptacle such that a longitudinal axis of the third receptacle is in parallel relation to the longitudinal axis of the first receptacle.

6 Claims, 4 Drawing Sheets

HOUSING FOR WATER FILTER CARTRIDGES

CROSS-REFERENCE TO RELATED APPLICATIONS

Not applicable.

BACKGROUND OF THE INVENTION

1. Field of the Invention

The present invention relates to water filter cartridges. More particularly, the present invention relates to housings that receive water filter cartridges therein. In particular, the present invention relates to a housing that receives different types of water filter cartridges therein.

2. Description of Related Art Including Information Disclosed Under 37 CFR 1.97 and 37 CFR 1.98

Domestic purification of drinking water at the point-of-use is becoming increasingly important to many consumers. Water is usually purified to one extent or another by most municipalities prior to being supplied to consumers. Such municipal purification systems are, however, often inadequate and incapable of removing many contaminants which adversely affect the taste of drinking water.

Some of the existing problems in the art regarding filtration systems involve filter replacement compliance, filter retention during operation, modularity, and modification of system components to establish series or parallel flow to accommodate different filtration schemes.

There remains a demand in industry and in commercial and domestic settings for filter systems that can be used in diverse applications and which can be assembled in modular form to achieve specific and specialized filtration needs. It is desirable for such filter systems to be adaptable to various filtering needs and filtering capacities. Furthermore, a filter system installed in the supply line will generally require routine maintenance for cartridge replacement and/or manifold repair. A modular system capable of detachment and reassembly allows a user to perform replacement and/or repair without the need to remove the entire filter assembly.

Many applications require that more than one filter be employed to selectively remove different impurities. A filtration system may require the application of reverse osmosis membrane filters as well as other specialty filters that require pre-removable of contaminants, such as chlorine and/or sediment, in order to operate efficiently and properly. In such situations, some contaminants may first be removed from the feedwater by passing the fluid through an upstream pre-filter before the filter is fed into a filter array positioned downstream. The treatment of fluids through multiple filters is known to have an effect on the quality of filtered water as it passes through the filtering system. Both the number of filters and the type of filter media contained in the filters can affect the amount and type of contaminants removed from a treated water. As such, it is desirable to provide a filtering system in which the number of individual filter cartridges, the type of filter media, and the particular configuration of the filtering system can be readily assembled and implemented. It is important to note, however, that filter removal and replacement often requires significantly more attention and work when the filtration system uses different types of filters for filtering different substances from the fluids. Thus, a modern filtration system that can readily accommodate the assembly/disassembly of various filter cartridges is desirable.

Where multiple types of filters are employed, the structure of the filter assembly can be somewhat unstable and can occupy a large amount of space. In various applications, it is desirable to minimize the footprint of the assembly of such filters. Additionally, it is important that the filters have a stable platform for the receipt of control electronics and pumps. In conventional multi-filter systems, the filters can be connected individually to each other in a series-type assembly. In other circumstances, the filters can be arranged in a stacked configuration. In either of these configurations, the control electronics and the pump must be separately installed away from the filters. This will inherently increase the footprint of the filtering system. As such, a need has developed so as to provide a housing that can receive the various cartridges of the filter system and also provide a platform for the pump and the control f electronics associated with the filtering system.

In the past, various patents and patent application publications have been published with respect to such multi-filter water filter systems. For example, U.S. Pat. No. 5,328,609, issued on Jul. 12, 1994 to Magnusson et al., describes a multi-stage radial flow filtration system. This system includes a disposable filter cartridge having first and second radial flow filtration stages containing filtration media of uniform porosity. A first stage includes a pair of annular, concentrically mounted, fibrous sediment and cast carbonaceous filter media. A second stage includes an annular cast carbonaceous filter media. Porous stage separators sequentially direct liquid flow into cavity spaces between the side walls of each stage and a liquid impermeable housing where the flow is radially redirected inward toward a center outlet bore. The first stage filters suspended sediments, lead and other heavy metals. The second stage removes suspended bacteria, parasites, volatile organic contaminants, herbicides, pesticides, industrial and agricultural contaminants, and the like. Various cartridge constructions have alternating O-ring sealed and caps.

U.S. Pat. No. 5,342,519, issued on Aug. 30, 1994 to Friedmann et al., describes a fluid filter cartridge with replaceable filter element. This is a spin-on fluid filter cartridge having a replaceable filter element which has an housing, an internally threaded annular collar, a replaceable filter element, and an externally threaded mounting head assembly. The annular collar is secured inside the housing ant its open upper end. A sealing ring and an annular channel adjacent the external threads of the mounting head seals the cartridge when the mounting head assembly is threaded onto the annular collar.

U.S. Pat. No. 5,407,571, issued on Apr. 18, 1995 to C. N. Rothwell, provides a filter unit for a modular filter assembly that comprises a head having a feed chamber and a discharge chamber, and a casing surrounding a filter element. Fluid flow from the feed chamber to the discharge chamber of the filter unit passes through the filter element. The head is provided with a first inlet opening and a first outlet opening which communicates with the feed chamber. The head is provided with a second inlet opening and a second outlet opening which communicate with the discharge chamber.

U.S. Pat. No. 6,360,764, issued on Mar. 26, 2002 to K. Fritze, shows a cartridge adapter for use in mating a filter cartridge to a filter manifold. This adapter assembly includes an adapter body having a manifold coupler and a cartridge coupler. The manifold coupler is for mating with the filter manifold and has an inlet fluidly communicable with a filter manifold fluid inlet and a fluid outlet being fluidly communicable with a filter manifold fluid outlet. A sealing means isolates an inlet flow of unfiltered water from an outlet flow of filtered water. The cartridge coupler mates with the filter cartridge and has an inlet fluidly communicable with a filter cartridge and an outlet in fluid communication with the manifold coupler inlet and a fluid outlet being fluidly communicable with a filter cartridge outlet and in fluid communication with the manifold coupler outlet. At least one valve is disposed in the adapter body to control the flow of water therethrough.

U.S. Patent Application Publication No. 2005/0045552, published on Mar. 3, 2005 to J. W. Tadlock, describes a fluid a modular fluid treatment apparatus and method in which modules of the system can each have a head that can be connected to one or more heads in different configurations. The relationship between the cartridge of the module and its corresponding head prevents fluid from entering between the cartridge and an external shell of the module. The module has a head with a substantially concentric inlet and outlet ports in fluid communication with a cartridge coupled to the head.

U.S. Patent Application Publication No. 2006/0186026, published on Aug. 24, 2006 to M. K. Saleh, provides a compact water purification apparatus for purifying water from a municipal water supply prior to a point-of-use. This water purification apparatus has multiple water purification units that can include cartridge filters for removing chlorine, rust and sediment, heavy metals, dissolved iron, hydrogen sulfide, chloroform, and lead. An ultraviolet light source is also connected in series. A bypass conduit is connected in parallel with the water purification units.

U.S. Patent Application Publication No. 2007/0000833, published on Jan. 4, 2007 to Levy et al., discloses a model modular fluid purification system having a disposable sump assembly and an improved flow distribution plate. The system is adaptable to a variety of configurations without the need for re-piping or re-plumbing of the installation.

U.S. Patent Application Publication No. 2015/0344321, published on Dec. 3, 2015 to M. L. Allsip, teaches a water filter assembly including a first filter cartridge and a second filter cartridge mounted to a manifold. The first and second filter cartridges are plumbed into the manifold such that unfiltered water from an inlet of the manifold flows in parallel to the first and second filter cartridges. A third filter cartridge is also mounted to the manifold. The third filter cartridge is plumbed into the manifold such that the filtered water from the said first and second filter cartridges is directed into the third filter cartridge.

U.S. Patent Application Publication No. 2019/0282938, published on Sep. 19, 2019 to Fiox et al., discloses a modular filtration platform having at least one manifold head and at least one respective filter cartridge assembly. Each manifold head is connected to one another to establish a water flow in series or parallel. Each filter cartridge assembly is releasably secured from rotation relative to the manifold head by a locking mechanism. An aperture on the filter cartridge assembly's annular collar mates with a protruding resilient extension on either the manifold head or the support bracket. An integrated sensor package can be integrated with the system for true managed water visible/audible indications.

It is an object of the present invention to provide a housing for water filter cartridges which arranges the filters in an optimally efficient manner.

It is another object of the present invention to provide a housing for water filter cartridges in which the cartridges are supported in a very strong and sturdy configuration.

It is another object of the present invention provide a housing for water filter cartridges which provides a platform for the pump and control electronics associated with the filtering of water.

It is a further object of the present invention to provide a housing for water filter cartridges that has a minimal footprint.

It is still another object of the present invention to provide a housing for water filter cartridges in which at least some of the cartridges are interchangeable within various receptacles.

It is still a further object of the present invention to provide a housing for water filter cartridges which is reusable.

These and other objects and advantages of the present invention will become apparent from a reading of the attached specification and appended claims.

BRIEF SUMMARY OF THE INVENTION

The present invention is a housing for water filter cartridges. This housing comprises a first receptacle having an interior, a second receptacle having an interior, and a third receptacle having an interior. The interior of the first receptacle is adapted to receive a first water filter cartridge therein. The interior of the second receptacle is adapted to receive a second water filter cartridge therein. The interior of the third receptacle is adapted to receive a third water filter cartridge therein. The second receptacle is positioned to one side of the first receptacle such that a longitudinal axis of the second receptacle is in parallel relation to a longitudinal axis of the first receptacle. The third receptacle is positioned above the first receptacle such that a longitudinal axis of the third receptacle is in parallel relation to the longitudinal axis of the first receptacle.

The second receptacle has an outer wall having a lowermost point. The first receptacle has an outer wall having a lowermost point in coplanar relation to lowermost point of the second receptacle. The second receptacle has an outer diameter that is less than an outer diameter of the first receptacle. The first receptacle, the second receptacle and the third receptacle are integrally molded together of a polymeric material.

The third receptacle has a wall with an outermost point. The first receptacle has an outermost point on the wall thereof that is in coplanar relation with the outermost point of the third receptacle. The third receptacle has an outer diameter less than an outer diameter of the first receptacle. The third receptacle is positioned directly above the first receptacle and away from the second receptacle.

The housing of the present invention further comprises a base integrally formed with the first receptacle and the second receptacle. An outer wall is integrally formed with the first receptacle and the third receptacle. The outer wall extends in transverse relation to the base.

A support wall is integrally formed in association with the first receptacle, the second receptacle and the third receptacle. The support wall has an upper planar surface formed above the third receptacle and a lower planar surface formed above the second receptacle. The support wall has a portion extending at an obtuse angle from the lower planar surface to the upper planar surface.

A metal plate is affixed to the support wall. This metal plate has a first portion overlying the upper planar surface and a second portion overlying the lower planar surface. The metal plate has a section overlying the portion of the support wall.

A pump is affixed to the section of the metal plate. This pump overlies the second receptacle in is positioned to a side of the third receptacle. At least a pair of mounts extend outwardly of the section of the metal plate. The pump is affixed to this pair of mounts. Control electronics are affixed to the first portion of the metal plate that overlies the upper planar surface of the support wall. The control electronics are positioned directly above the first receptacle and the third receptacle.

In the preferred embodiment of the present invention, the first receptacle is adapted to receive a reverse osmosis filter therein. The second receptacle in the third receptacle are adapted to receive either a carbon filter or a sediment filter therein. The first receptacle, the second receptacle and the third receptacle each have length dimensions that is substantially identical. Of course, a wide variety of other types of filters can be used in the housing of the present invention.

The metal plate is affixed to an exterior of the second receptacle and the third receptacle. This metal plate has a first portion overlying the third receptacle and a second portion overlying the second receptacle. The metal plate has a section extending between the first portion and the second portion. The first portion and the second portion are in parallel planar relation to each other. The section extends at an obtuse angle from the second portion to the first portion. The metal plate has a width dimension that is less than the length dimension of the first, second and third receptacles.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
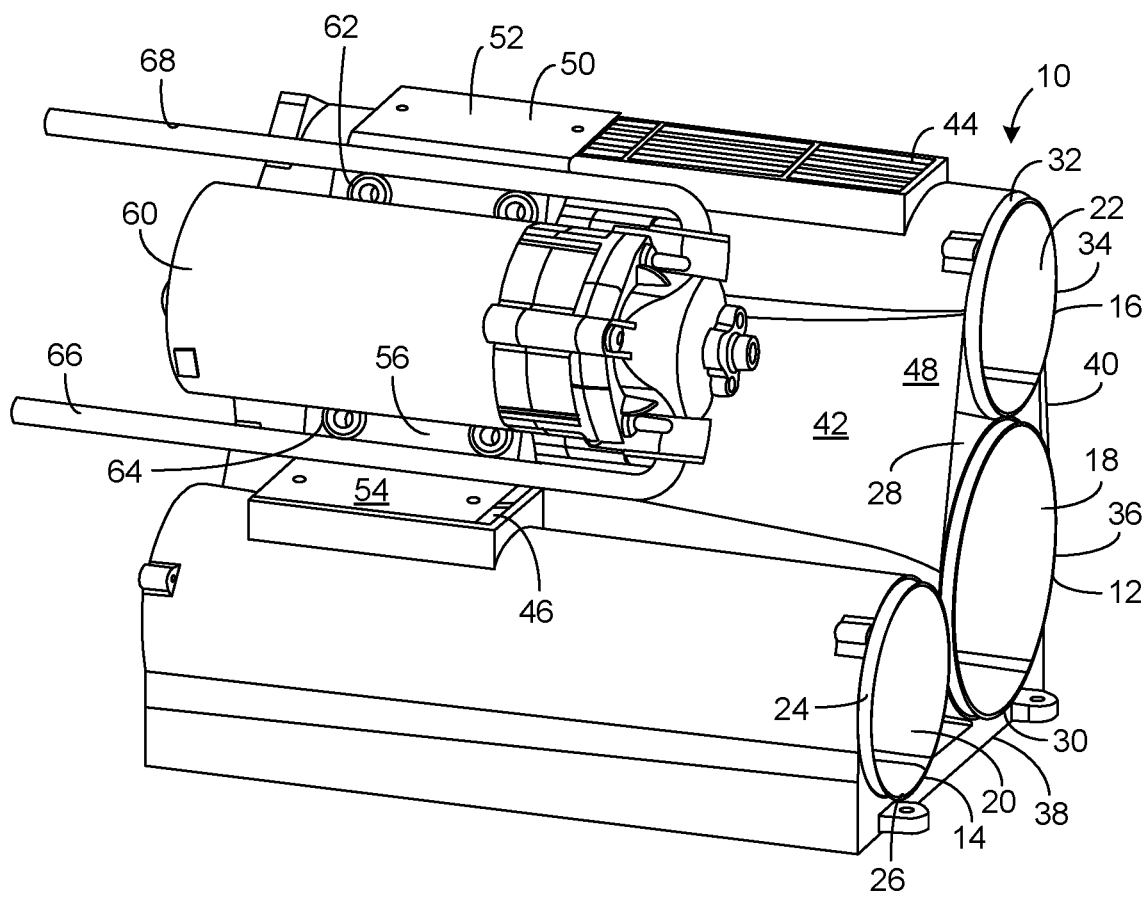
FIG. 1 is an upper perspective view showing the assembly with the housing for water filter cartridges of the present invention.

Referring to FIG. 1, there shown the housing 10 for receiving water filter cartridges in accordance with the teachings of the present invention. Housing 10 comprises a first receptacle 12, a second receptacle 14, and a third receptacle 16. The first receptacle 12 has an interior 18 that is adapted to receive a first water filter cartridge therein. The second receptacle 14 has an interior 20 that is adapted to receive a second water filter cartridge therein. The third receptacle 16 has an interior 22 that is adapted to receive a third water filter cartridge therein. The second receptacle 14 is positioned to one side of the first receptacle 12 such that a longitudinal axis of the second receptacle 14 is in parallel relation to a longitudinal axis of the first receptacle 12. The third receptacle 16 is positioned above the first receptacle 12 such a the longitudinal axis of the third receptacle 16 is in parallel relation to the longitudinal axis of the first receptacle 12.

The second receptacle 14 has an outer wall 24 that has a lowermost point 26. The first receptacle 12 has an outer wall 28 having a lowermost point 30. The lowermost point 26 of the second receptacle 14 is in coplanar relation to the lowermost point of the first receptacle 30. It can be seen in FIG. 1 that the second receptacle 14 has an outer diameter that is less than an outer diameter of the first receptacle 12.

The third receptacle 16 has a wall 32 with an outermost point 34. The first receptacle 12 also has its wall 28 with an outermost point 36. The outermost point 34 of the third receptacle 16 is in coplanar relation with the outermost point 36 of the first receptacle 12. The third receptacle 16 has an outer diameter less than an outer diameter of the first receptacle 12. The third receptacle 16 is positioned directly above the first receptacle 12 and away from the second receptacle 14.

FIG. 1 further shows that the housing 10 has a base 38 that is integrally formed with the first receptacle 12 and the second receptacle 14. An outer wall 40 is integrally formed with the first receptacle 12 and the third receptacle 16. The outer wall 40 extends in transverse relationship to the base 38. A support wall 42 is integrally formed with the first receptacle 12, the second receptacle 14 and the third receptacle 16. The support wall 42 has an upper planar surface 44 formed above the third receptacle 16 and a lower planar surface 46 formed above the second receptacle 14. The support wall 42 has a portion 48 that extends at an obtuse angle from the lower planar surface 46 to the upper planar surface 44.

In FIG. 1, it can be seen that there is a metal plate 50 that is affixed to the support wall 42. The metal plate 50 has a first portion 52 that overlies the upper planar surface 44 and a second portion 54 that overlies the second planar surface 46. The metal plate 50 has a section 56 that overlies the portion 48 of the support wall 42.

A pump 60 is affixed to the section 56 of the metal plate 50. Pump 60 overlies the second receptacle 14 and is positioned to a side of the third receptacle 16. There is at least a pair of mounts 62 and 64 that extend outwardly of the section 56 of the metal plate 50. The pump 60 is affixed to the pair of mounts 62 and 64.

As will be described hereinafter, control electronics can be affixed to the upper planar surface 44 of the support wall 42 and, in particular, to the first portion 52 of the metal plate 50. The control electronics will be positioned directly above the first receptacle 12 and the third receptacle 16.

In an exemplary embodiment of the present invention, the first receptacle 12 is adapted to receive a reverse osmosis filter therein. The second receptacle 14 and the third receptacle 16 are adapted to separately receive a carbon filter and/or a sediment filter therein. As such, the second receptacle 14 and the third receptacle 16 can interchangeably receive these filters or other filters therein. The first receptacle 12, the second receptacle 14 and the third receptacle 16 are all integrally formed of a polymeric material. FIG. 1 shows that the first, second and third receptacles have a length dimension that is substantially identical.

In FIG. 1, the pump 60 is shown as having an inlet line 66 and an outlet line 68. As such, the pump 60 operates to deliver water, to be filtered, into the water filter cartridges within each of the receptacles 12, 14 and 16. Control electronics are connected to the pump 60 so as to control and monitor the operation of the pump 60.

The housing 10 of the present invention has a significant number of advantages over the prior art. In particular, the present invention provides receptacles for each of the water filter cartridges in a very efficient array. In particular, each of the receptacles is positioned so as to minimize the amount of area that each of the cartridges occupies. Since the receptacles allow each of the cartridges to be put placed in close side-by-side relationship, the cartridges will present a minimal footprint. The integral molding of each of the receptacles 12, 14 and 16 assures that the structure of the housing 10 is very strong. As such, the filter cartridges can be placed into each of the receptacles in a secure and sturdy manner. The placement of the pump 60 along the support wall 42 upon the section 56 of the metal plate 50 and upon the portion 48 of the support wall 42 positions the pump in an area within which the receptacles and the cartridges lie. As such, the pump is closely adjacent to each of the filters so as to maximize the amount of pumping capability associated with the delivery of water to and from the filter cartridges. This placement of the pump 60 has been found to uniquely minimize the amount of vibrations from the pump to the housing 10. The circular yet integral structure of each of the receptacles 12, 14 and 16 serves to distribute the vibrations from the pump 60 over a very wide area in order to minimize the influence of the vibration on the operation of the filter cartridges or upon the control electronics. The placement of the various receptacles 12, 14 and 16 allows a user to easily install filter cartridges within the housing. It is only necessary to slide the cartridges into each of the receptacles and then rotate the cartridges. When the cartridges need replacement, they can easily be rotated in an opposite direction and removed. The reverse osmosis filter cartridge is positioned in proximity to the pump 16 and in the center of the configuration so as to more strongly withstand the effect of pressure applied to liquids passing through the pores of the reverse osmosis filter.

Figure 2:
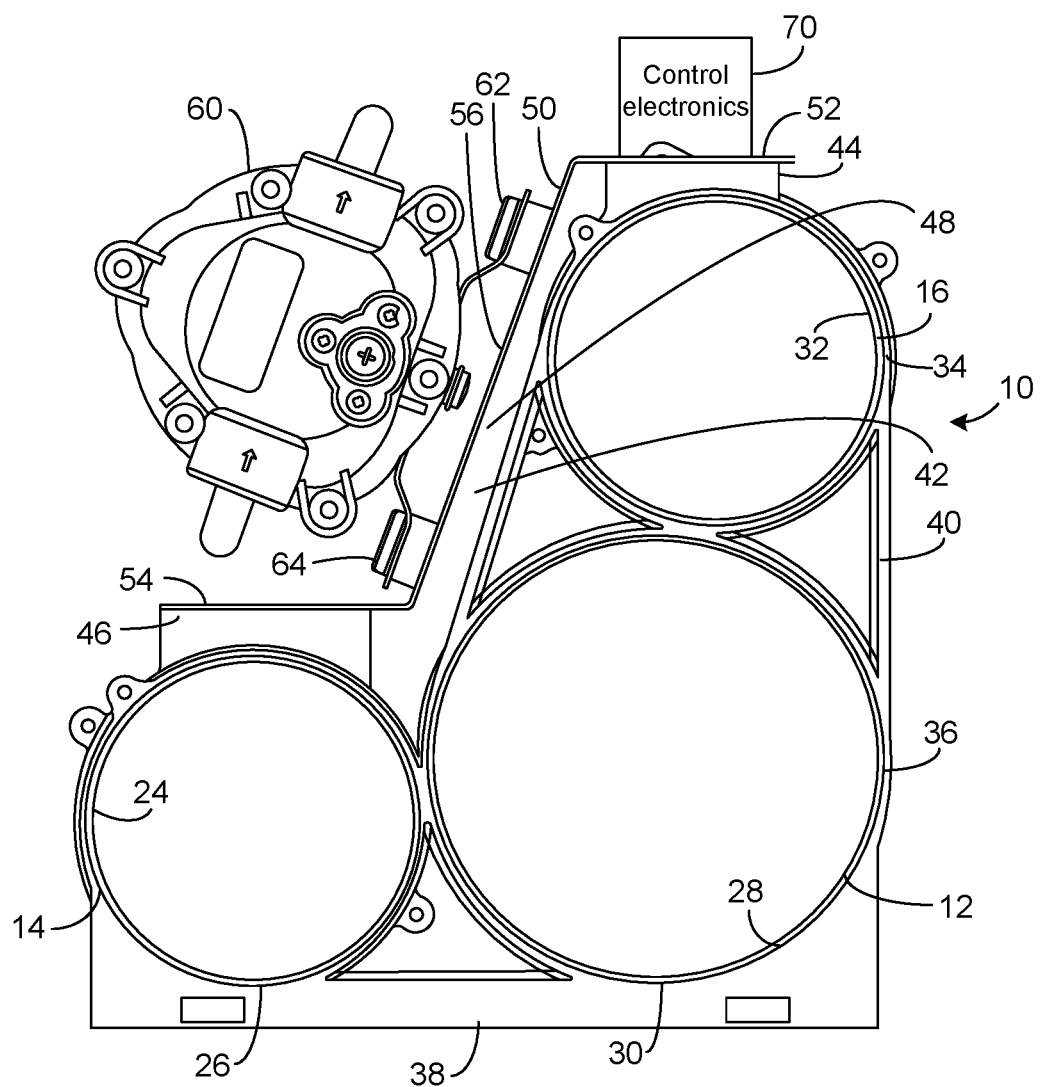
FIG. 2 is an end view of the assembly a having the housing for water filter cartridges of the present invention.

FIG. 2 shows the housing 10 of the present invention and, more particularly, shows the arrangement of the first receptacle 12, the second receptacle 14 and the third receptacle 16. The second receptacle 14 has lowermost point 26 in coplanar relationship with the lowermost point 30 of the first receptacle 12. The outermost point 36 of the first receptacle 12 is in coplanar relationship with the outermost point 34 of the third receptacle 16. It can be seen that the second receptacle 14 and the third receptacle 16 each have smaller inner diameters than the inner diameter of the first receptacle 12.

In FIG. 2, it can be seen that the base 38 is molded directly to the wall 28 of the first receptacle 12 and to the wall 24 of the second receptacle 14. Similarly, the outer wall 40 is molded directly to the wall 32 of the third receptacle 16 and of the wall 28 of the first receptacle 12. Outer wall 40 extends in transverse relationship to the base 38. The support wall 42 has an upper planar surface 44 and a lower planar surface 46. The support wall 42 has a portion 48 that extends at an obtuse angle from the lower planar surface 46 to the upper planar surface 44. Metal plate 50 is positioned over the support wall 42 so as to have a first portion 52 overlying the upper planar surface 44 and a second portion 54 overlying the lower planar surface 46. The section 56 of metal plate 50 will extend between the first portion 52 and the second portion 54. The pair of mounts 62 and 64 are illustrated as extending outwardly of the section 56 of the metal plate 50. Pump 60 is affixed to these mounts 62 and 64.

FIG. 2 shows that the control electronics 70 are affixed to the first portion 52 of the metal plate 50 and to the upper planar surface 44 of the support wall 44. This configuration provides a very sturdy support for the control electronics 70. The control electronics 70 can be connected by conventional means to the pump 64 the monitoring and control of the pump 60. It can be seen that the control electronics 60 are isolated from the pump 60. Any vibrations of the pump 60 are diffused throughout the structure of the housing 10 so as to only minimally reach the control electronics 70. As such, this provides a significant buffer against unwanted vibrations that could adversely affect the control electronics 70.

Figure 3:
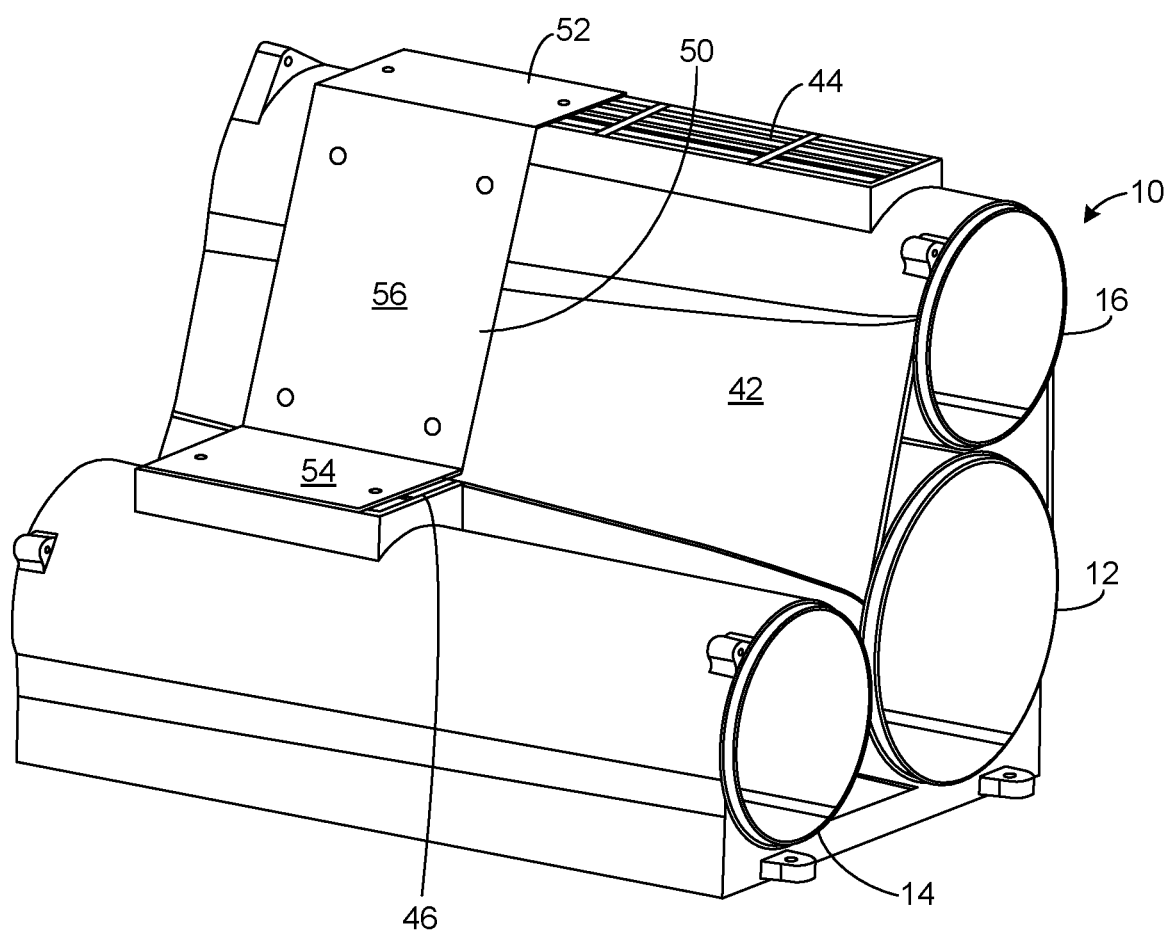
FIG. 3 is an upper perspective view showing the housing for water filter cartridges in accordance with the teachings of the present invention.

FIG. 3 shows the metal plate 50 as positioned over the upper planar surface 44, over the support wall 42, and over the lower planar surface 46. In particular, the metal plate 50 has a first portion 52 that overlies a portion of the upper planar surface 44. It can be seen that the upper planar surface 44 has a plurality of fins and slots formed therein. Once again, these fins and slots serve to diffuse any vibrations from reaching the control electronics mounted on the first portion 52 of the metal plate 50. The slots and fins further serve to minimize the weight of the housing 10 and also serve to distribute heat. The metal plate 50 also has a portion 54 that is positioned and mounted to the lower planar surface 46 of the support wall 42. The second portion 54 provides a strong support for the section 56 that receives the pump thereon. The lower planar surface 46 also include several fins and slots so as to minimize vibration, minimize weight and diffuse heat. FIG. 3 further shows that the width of the metal plate 50 is substantially less than the length dimensions of the first receptacle 12, the second receptacle 14 and the third receptacle 16.

Figure 4:
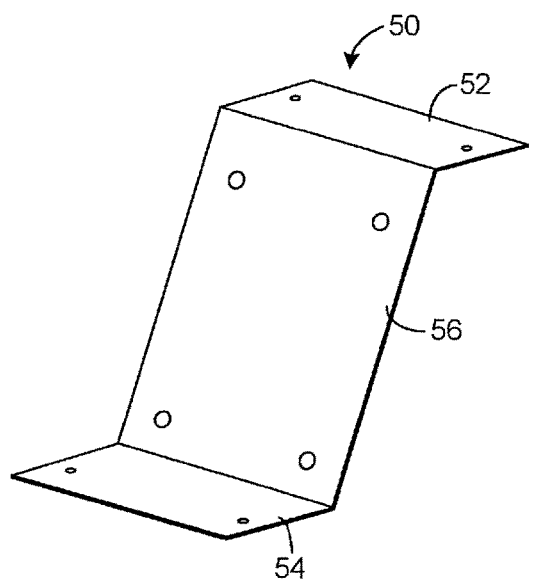
FIG. 4 is an upper perspective and isolated view showing the metal plate as used on the housing for water filter cartridges of the present invention.

FIG. 4 is an isolated view of the metal plate 50. It can be seen that the metal plate 50 has a generally Z-shaped configuration. Metal plate 50 includes a first portion 52 that is of the planar configuration. The second portion 54 is also of a planar configuration. The section 56 extends at an obtuse angle from the second portion 54 to the first portion 52. Each of the portions 52 and 54 and the section 56 include suitable openings for receiving fasteners and/or mounts therein.

Figure 5:
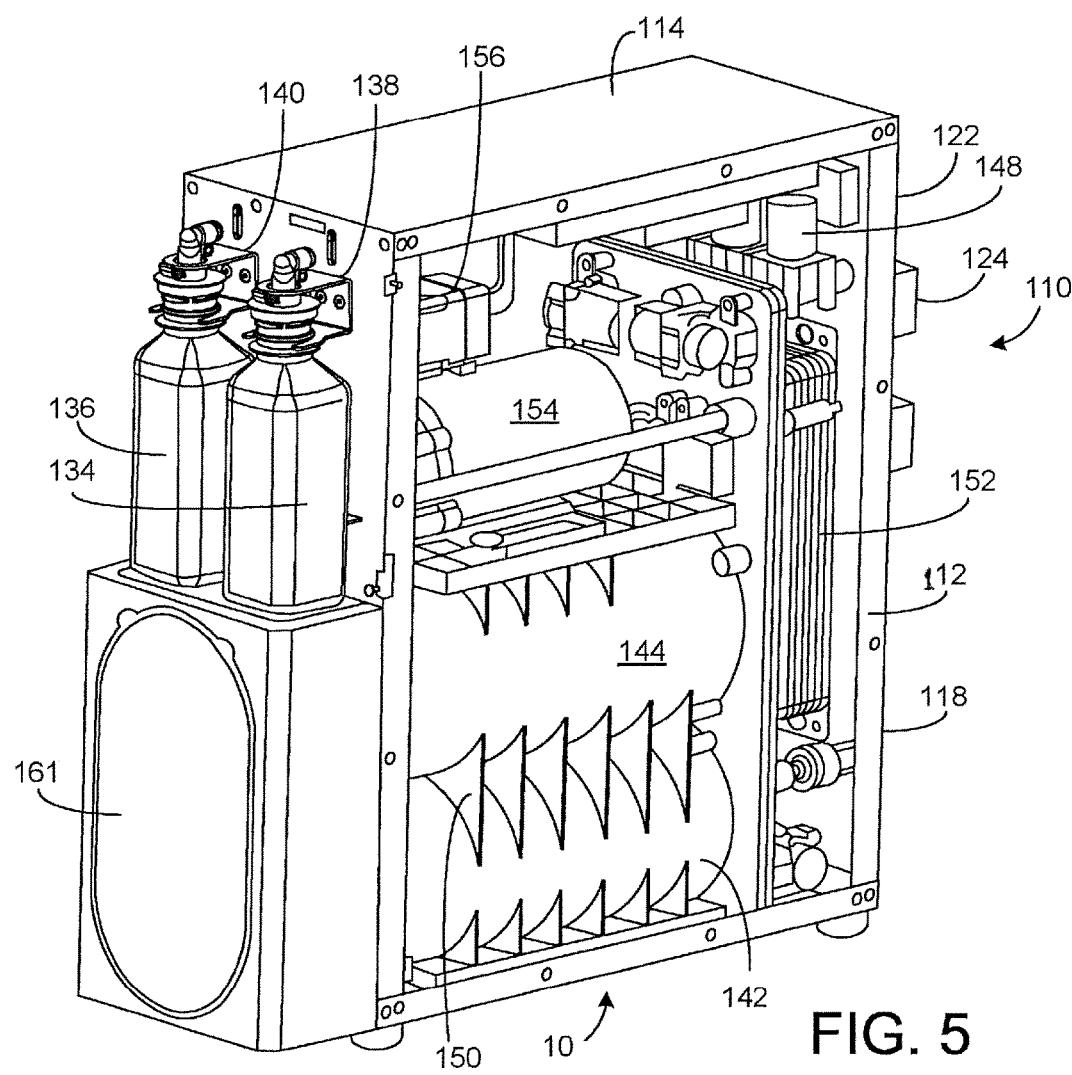
FIG. 5 is an interior view showing a system that can employ the housing for water filter cartridges of the present invention.

FIG. 5 shows the housing 10 of the present invention employed in a water mineralization system 110. Water mineralization system 110 is the subject of U.S. patent application Ser. No. 17/815,479, filed on Jul. 27, 2022, by the present Applicant. In particular, FIG. 5 shows that the inlet 124 at the back wall 122 has a valve 148 associated therewith. Valve 148 is movable between an open position and a closed position. In the closed position, tap water flow into the interior of housing 112 is blocked. In the open position, tap water flow into the interior of the housing 112 is permitted. The valve 148 is easily accessible so as to allow water flow to be immediately turned off in the event that a leak should occur or in the event that leak detection equipment within the interior of the housing 112 should signal a leak.

In FIG. 5, it can be seen that the first receptacle 142 and the third receptacle 144 extend longitudinally across the housing 112. The second receptacle is obscured in FIG. 5. Various brackets 150 support the housing of the present invention in its desired position. A manifold 152 is illustrated as positioned adjacent to the back wall 118 of the housing 112. Manifold 152 extends in a generally vertical orientation. The manifold 152 is positioned between the first and third receptacles 142 and 144 and the back wall 118. Manifold 152 serves to receive the flow of a mineral or supplement-containing liquid as pumped from the bottles 134 and 136 and mixes the mineral-containing liquid in the manifold 152 with the filtered water from the water filter cartridges within the first, second and third receptacles of the housing 10.

Since it is necessary to pressurize the pre-treated water in order to have the pretreatment water flow through the reverse osmosis filter within first receptacle 142, a diaphragm pump 154 is positioned in the interior of housing 112. Diaphragm pump 154 (similar to pump 60 in the previous figures) will receive the pretreated water from one of the filters within the receptacles, pressurize the water, and then pass the water, under pressure, through the reverse osmosis filter within the receptacle 142. The filtrate from the reverse osmosis filter can then flow into the manifold 152 for the purposes of mixing the minerals with the demineralized water.

In reference to FIG. 5, it can be seen that the housing 10 of the present invention can be easily positioned within the interior of the housing 118. Once it is placed within the interior of the housing 118, each of the receptacles will be perfectly aligned for the receipt of the filter cartridges therein. The door 161 allows access to the open ends of each of the receptacles. This allows for the filter cartridges to be easily installed and/or removed from the respective receptacles.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A housing for water filter cartridges, the housing comprising:
   a first receptacle having an interior, the interior adapted to receive a first water filter cartridge therein;
   a second receptacle having an interior, the interior of said second receptacle adapted to receive a second water filter cartridge therein, said second receptacle being positioned to one side of said first receptacle such that a longitudinal axis of said second receptacle is in generally parallel relation to a longitudinal axis of said first receptacle;
   a third receptacle having an interior, the interior of said third receptacle adapted to receive a third water filter cartridge therein, said third receptacle positioned above said first receptacle such that a longitudinal axis of said third receptacle is in generally parallel relation to the longitudinal axis of said first receptacle;
   a support wall integrally formed with said first receptacle and said second receptacle and said third receptacle, said support wall having an upper planar surface formed above said third receptacle and a lower planar surface formed above said second receptacle; and
   control electronics affixed to the upper planar surface of said support wall, said control electronics positioned directly above said first receptacle and said third receptacle, said upper planar surface having fins and slots formed therein.

2. The housing of claim 1, said first receptacle adapted to receive a reverse osmosis filter therein, said second receptacle adapted to receive one of a carbon filter and a sediment filter therein, said third receptacle adapted to receive another of the carbon filter and the sediment filter therein.

3. The housing of claim 1, said first receptacle and said second receptacle and said third receptacle being integrally formed of a polymeric material.

4. The housing of claim 1, said first receptacle having a first length dimension, said second receptacle having a second length dimension, said third receptacle having a third length dimension, the first length dimension and the second length dimension and the third length dimension being substantially identical.

5. A housing for water filter cartridges, the housing comprising:
   a first receptacle having an interior, the interior adapted to receive a first water filter cartridge therein;
   a second receptacle having an interior, the interior of said second receptacle adapted to receive a second water filter cartridge therein, said second receptacle being positioned to one side of said first receptacle such that a longitudinal axis of said second receptacle is in generally parallel relation to a longitudinal axis of said first receptacle;
   a third receptacle having an interior, the interior of said third receptacle adapted to receive a third water filter cartridge therein, said third receptacle positioned above said first receptacle such that a longitudinal axis of said third receptacle is in generally parallel relation to the longitudinal axis of said first receptacle;
   a metal plate affixed to an exterior of said second receptacle and said third receptacle, said metal plate having a first portion overlying said third receptacle and a second portion overlying said second receptacle, said metal plate having a section extending between the first portion and the second portion, the first portion and the second portion being in parallel planar relationship, the section extending at an obtuse angle from the second portion to the first portion;
   a pump affixed to the section of said metal plate, said pump overlying said second receptacle in a position to a side of said third receptacle; and
   a reverse osmosis filter connected to said pump, said reverse osmosis filter received in one of said first receptacle and said third receptacle.

6. The housing of claim 5, said metal plate having a width dimension, the width dimension being less than the length dimension of said first, second and third receptacles.

* * * * *